United States Patent [19]

Vinokur

[11] 3,916,483

[45] Nov. 4, 1975

[54] APPARATUS FOR MANUFACTURE OF SKINLESS SAUSAGES

[76] Inventor: Isaac Vinokur, Av. Forest 1485, Buenos Aires, Argentina

[22] Filed: Oct. 7, 1974

[21] Appl. No.: 512,463

[30] Foreign Application Priority Data

May 28, 1974  Argentina ............................ 253948

[52] U.S. Cl. ........................... 17/32; 17/1 F; 99/441
[51] Int. Cl.² ............................................ A22C 7/00
[58] Field of Search .............. 17/32, 35, 1 F, 33, 38; 99/441, 443 R, 443 C

[56] References Cited
UNITED STATES PATENTS

| | | | |
|---|---|---|---|
| 3,092,872 | 6/1963 | Moule ..................................... | 17/32 |
| 3,287,761 | 11/1966 | Borsuk et al. ........................... | 17/32 |
| 3,319,286 | 5/1967 | Ammons et al. ........................ | 17/32 |
| 3,502,018 | 3/1970 | Keszler et al. ......................... | 99/441 |

Primary Examiner—Louis G. Mancene
Assistant Examiner—James D. Hamilton
Attorney, Agent, or Firm—Flynn & Frishauf

[57] ABSTRACT

Cylindrical moulds are mounted in an endless chain intermittently advanced through loading stations, an oven, a cooling area, an unloading station and a washing station. After a mould is filled by a feeder device at a loading station, end heads are applied, the excess filling is removed and caps are applied to the end head. After baking, the caps and end heads are removed to prepare for removal of the sausages. The cylindrical mould shells have external annular ridges and intervening spaces for receiving the chain links. The end heads have an axial perforation for receiving a mating piece of a cap member. The end heads and caps have flanges forming additional ridges and spaces when assembled to the mould shell. The operations of filling the mould shells, applying and removing end heads and caps are performed by machinery operated by double acting hydraulic cylinders controlled by valving a pressure fluid.

16 Claims, 28 Drawing Figures

APPARATUS FOR MANUFACTURE OF SKINLESS SAUSAGES

The present invention refers to an assembly for making skinless sausages and has the main purpose of providing an arrangement of means by which sausages are formed and cooked in a continuous operation without covering them with the known casing or skin normally made of gut, plastic or cellulose.

The process at present used for making skinless sausages consists in forming each sausage by filling a casing, normally made of gut, plastic or cellulose, with the mixture of the materials used as filler, cooking them and then withdrawing the cover by, for example injecting air to separate the casing from the cooked material, and thereupon disposing of the casings.

In accordance with that process, the casing is only used for forming and cooking the sausage and becomes useless and waste, thus increasing the cost of manufacture without any benefit to the consumer.

A reduction of manufacturing cost is one of the aims in producing sausages without having to use the casings or covers above referred to but up to the present time no arrangement has been found for practically accomplishing that purpose on a commercial scale.

Essentially, the stages required for making skinless sausages without using disposable casings are the following: filling a mould with a sausage mixture and softly pressing the mixture; submitting the mould to a cooking means; removing the formed and cooked sausage from the mould; and finally proceeding to clean the mould for repeating the sequence of stages as indicated herein.

It is an object of the invention to provide an apparatus for automatically and continuously carrying out this sequence of stages and to do so with higher quantity output than is presently available, without altering the quality of the product. As has been indicated, the main purpose of the invention is to provide machinery assembly for making skinless sausages in continuously operating stages, without having to use disposable casings.

SUBJECT MATTER OF THE PRESENT INVENTION

Briefly, cylindrical mould shells are used provided with annular ridges for seating connecting means for linking the moulds in an endless chain, which is arranged to be advanced intermittently into loading stations, a baking oven, a cooling area and an unloading station. Meat paste feeding means are provided for filling the mould shells at a first loading station. At successive stations end heads provided with an outer flange and an axial perforation are applied, followed by caps with projections fitting into the perforation of the end heads and having flanges fitting in spaced relation to the end head flanges. Between the loading stations scraping means are provided for scraping off excess meat paste issuing through the perforations in the end heads. At the unloading stations means are provided for removing the end heads and removing the finished sausages successively. A washing station is preferably provided between the unloading stations and the loading stations. The feeding means is actuated by a piston cooperating with valves for the meat paste and is preferably hydraulically powered. The means for applying and removing end heads and caps for intermittently advancing the chain of moulds can likewise be hydraulically driven.

The invention is described in detail by way of example of a preferred form of the invention with reference to the accompanying drawings, in which:

FIG. 18 is similar to FIG. 17 but shows the effect of putting a cap on;

The corresponding or equivalent parts of the apparatus of the invention are identified with the same reference numerals in all the Figures in which they appear. The basic components of the assembly are a multiplicity of moulds, each of which includes a cylindrical shell 1 having on its outer surface a pair of circumferential ridges 2 and 3 and also a pair of fitted rings 6 and 7 respectively located between the ridges 2 and 3 and the ends 4 and 5 of the shell 1. The rings 6, 7 can also be a part of the shell like the ridges 2 and 3, instead of being fitted to the shell 1 in the manner shown in FIG. 2. They can also be seated on grooves rather than on ridges.

Figure 2:
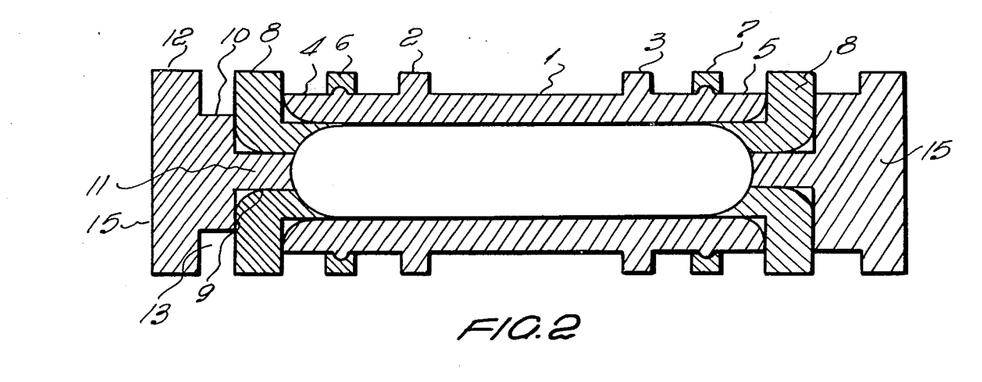
FIG. 2 is a longitudinal section of one of the moulds used for the apparatus of FIG. 1.

The mouth portions of the ends 4 and 5 of the shell 1 are slightly curved (internally flared) to facilitate the insertion of the end heads 8, which are a disc-like elements having an inserting portion of smaller diameter fitting into the shell 1 to provide a suitable end profile. The edge of the disc may be regarded as a flange of the insertion plug. The end head body has an axial perforation 9 through it. The insertion plug, as illustrated, has a hemispheric surface closing off the shell when the ends of the sausages are to have a rounded shape, as is indicated in FIG. 2. This surface may be flat or straight when it is desired that the ends of the sausages have a flat or straight shape.

The insertion plug of the end head has about the same diameter as the interior of the mould where it is to be introduced. The projection 11 extending from the central portion 10 of a cap is introduced into the perforation 9 of the end head. The cap has an end flange 12 spaced from the abutment of the cap on the end head, so that an annular space 13 is provided when the cap projection 11 is placed inside the perforation 9.

It is preferable that a mould such as the one described herein, which has to be subjected to the heat required for cooking the paste making the sausage, should be made of a material having a low friction coefficient. Tetrafluorethylene has been found to have this desirable effect although this material is not specifically or critically required. Any other material having similar characteristics can be used and the choice of materials is not the basis of the invention.

Figure 5:
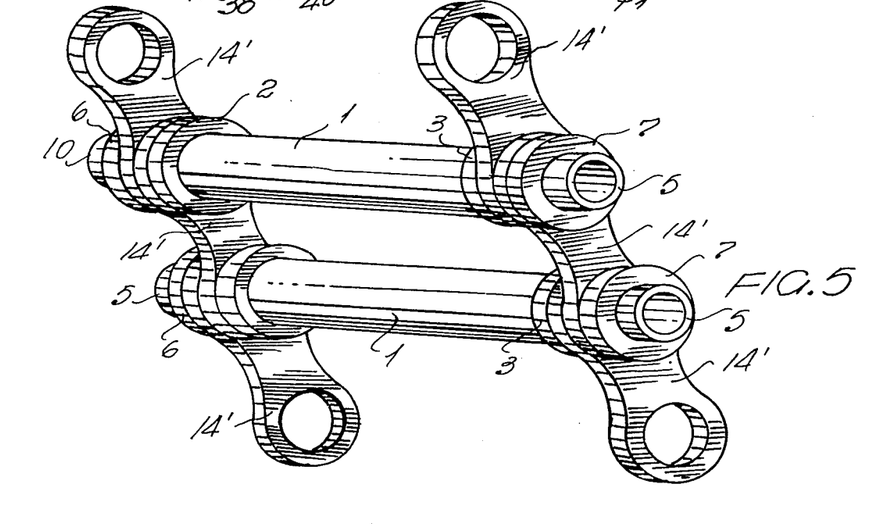
FIG. 5 is a perspective view on a larger scale of some links of the chain of interconnecting moulds.

The annular spaces between the ridge 2 and the ring 6 and between the ridge 3 and the ring 7 constitute the positions for fitting the moulds in an endless chain 14 having links 14' of figure-8 shape, as shown in FIG. 5, in order to articulate an endless chain mounted between at least two pairs of sprocket wheels 16 and 17. In the example illustrated in FIG. 1, the sprocket wheel pair 16 is the driving pair for advancing the chain 14 in step by step movement.

Figure 1:
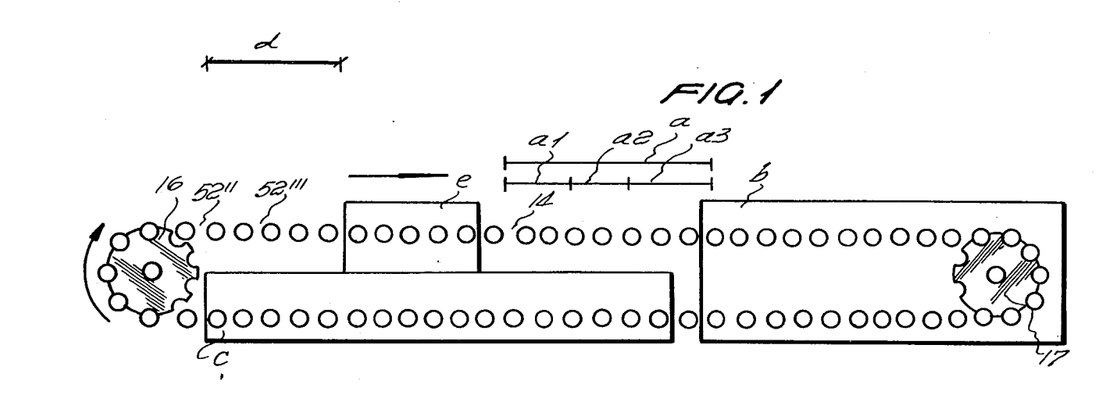
FIG. 1 is a schematic overall view in side lateral elevation of a preferred form of apparatus according to the invention.

The stations a, b, c, d and e are arranged through all the length of the endless chain 14 so that station a corresponds to the action of filling the mould with the paste forming the sausages and putting the end heads and the caps on both sides of the moulds; station b corresponds to the cooking stage; station c is the cooling stage; station d represents the stage for removing the caps and end heads from the moulds and for taking the formed sausages out of the moulds; and station e is provided for washing the moulds.

The portions of the endless chain located between the sprocket pairs 16 and 17 are provided with guides 18 which confine the circumferential ridges 2 and 3 of the moulds held in the chain. The guides 18 have an angular shaped section shown in FIGS. 13 and 14.

Figure 15:
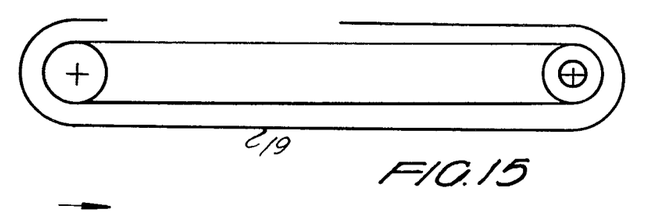
FIG. 15 is a schematic view showing the arrangement of guides for keeping the moulds closed.
Figure 19:
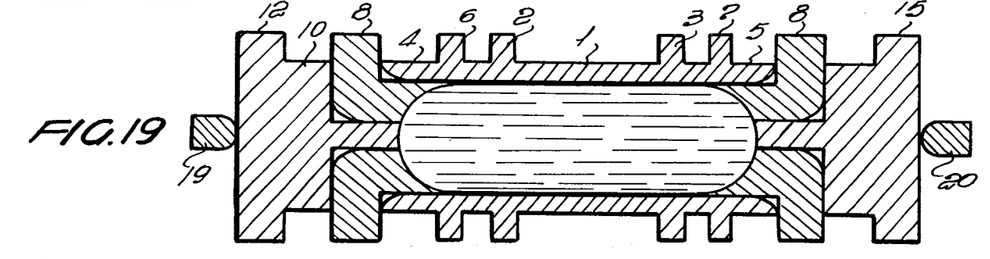
FIG. 19 is a longitudinal section of a mould having its two caps on, showing the adjacent retaining guides.

Now, as can be observed in FIGS. 15 and 19, all along the stations b and c and the perimeter of the sprocket wheels, another set of guides 19 is laterally arranged on each side of the chain portions. The guides 19 make contact with the front sides 15 of the caps in order to hold or retain the caps pressed against the ends 4, 5 of the mould shells 1 with the end heads 8 held between the caps and the moulds. The guides 19 release the caps and the end heads as they pass on the lengths of the chain corresponding to the stations a, d and e.

The step by step advance of the endless chain 14 is accomplished by a moving mechanism formed by a ratchet wheel 20 attached to the shaft 21 on which the sprocket wheels 16 are set, and by the pawl 22 pivoted at 23 on the lever 24 which freely rotates on the shaft 21 at one end and has its other end connected to the rod 25 of the piston 26 of a pneumatic cylinder 27. (See FIG. 22)

Figure 22:
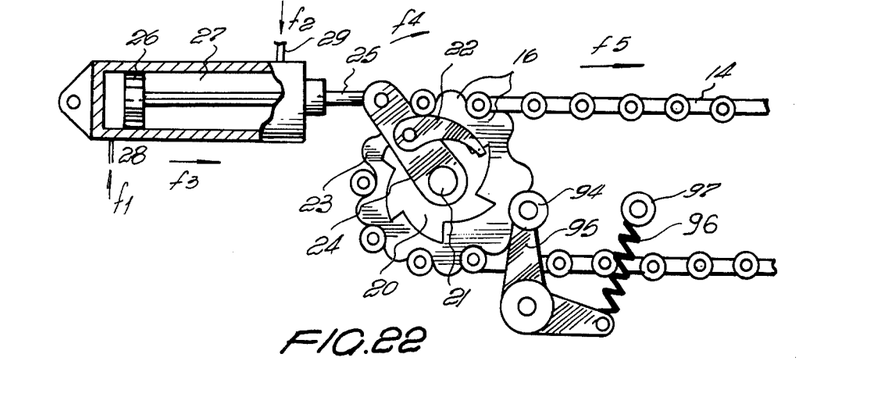
FIG. 22 is a side elevation, partly in section of the advancing mechanism for moving the chain.

By reason of this arrangement of the advancing mechanism, when fluid is supplied to the cylinder 27 through the conduit 28, as indicated by the arrow $f_1$ in FIG. 22, the piston 26 is moved as per the arrow $f_3$ and acts upon the lever 24 and through pawl 22 upon the ratchet 20, which rotates the shaft 21 and the sprockets 16 in the direction of $f_4$; upon the piston 26 reaching its right dead end point, the fluid conduit 28 is closed and the feeding of fluid is started through 29, as indicated by $f_2$, thus moving the piston 26 in a direction opposite to $f_3$ and establishes the rotation of 24 in a direction opposite to $f_4$ with the resulting release of pawl 22 from ratchet 20 and immobility of sprocket 16 while the piston 26 is moving from its right dead end point to the left. Repetition of the cycle results in intermittent movement in the direction indicated by $f_5$.

The paste feeder 30 (FIG. 3) is located at the start of portion $a'$ of station $a$, (FIG. 4) and is formed by a casing 31 enclosing a central chamber 32 for a two-way valve 33, an inlet pipe 34, a first branch pipe 35 and a second branch pipe 30. In the illustrated form of the device the branch pipes 35 and 30 extend in opposite directions from the valve 33.

Figure 3:
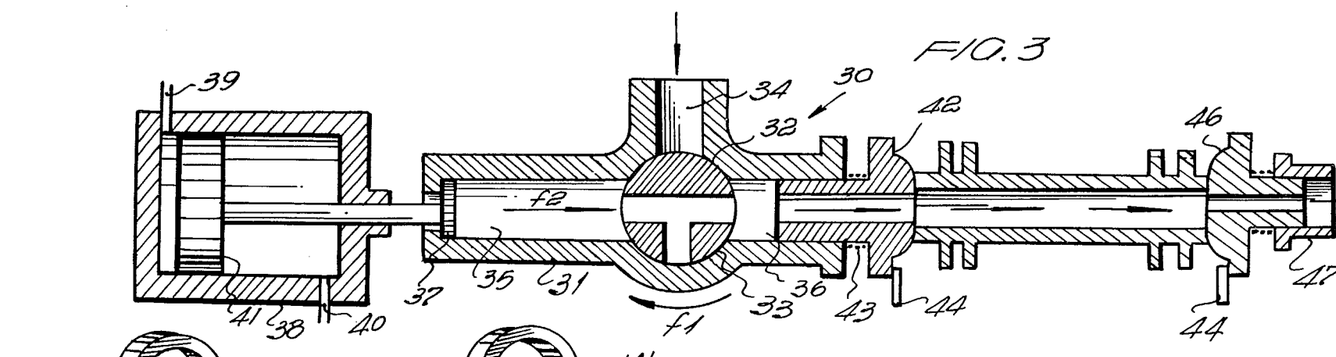
FIG. 3 is a longitudinal section of the filler mechanism and supplier of mixture or paste for the sausages.
Figure 4:
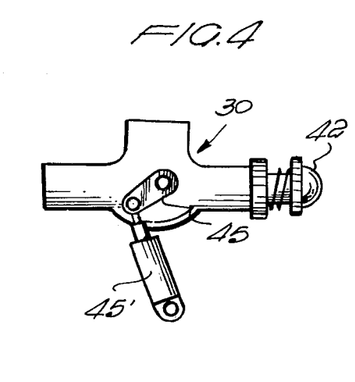
FIG. 4 is a side elevation of the mechanism for operating the paste supplier.

A sliding plunger 37 is located in the first branch pipe 35 and has a rod controlled by a pneumatic cylinder 38 having ports 39 and 40 which may operate alternatively as inlet or outlet for the fluid that moves the piston 41 of the cylinder 38; the second branch pipe 36, instead, has at its end a resilient mouthpiece 42 which is pressed by the spring 43 towards the mouth of the mould to be filled. A stopping means 44 is provided for limiting the movement of mouthpiece 42 when a mould is not facing the paste feeder 30.

The valve 33 is connected by a lever 45 (FIG. 4) to the double-acting pneumatic cylinder 45' that can rotate lever 45 and valve 33 in two opposite directions.

In the position indicated in FIG. 3 the feeder is ready to begin feeding paste when driving fluid flows into the cylinder 38 through duct 39. The amount of paste contained in branch pipe 35 will then pass through the valve 33, as indicated by the arrow $f_2$, toward the mouthpiece 42 and will load the waiting mould. Since said amount is slightly larger than the capacity of the mould, the excess will come out through a receiving mouthpiece 46. The mouthpiece 46 is similar to the mouthpiece 42 but the diameter of its passageway is smaller than that in mouthpiece 42. The receiving mouthpiece 46 is supported on the frame, not shown, of the apparatus by means of a sleeve 47.

After the filling is accomplished and the mould is loaded, the cylinder 45' rotates the valve 33 in the direction of the arrow $f_1$. This interrupts the communication between branch pipes 35 and 36 and establishes the communication between inlet 34 and branch pipe 35. Paste will then pass through 34 towards 35, and at the same time the plunger 37 and the piston 41 will move to the left of the figure and the chamber 35 will be loaded with paste. For the purpose of permitting paste to flow to 35, fluid is supplied to cylinder 38 through duct 40 and exhaust fluid is allowed to escape through 39. The plunger 37 will during this stage move to the left, back to the position shown in FIG. 3.

Figure 16:
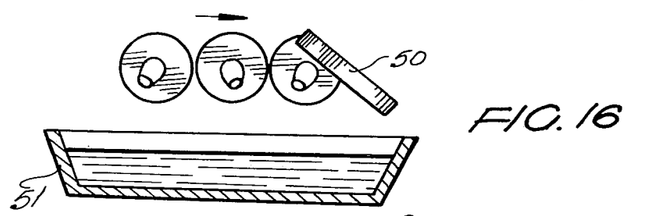
FIG. 16 shows the location of the plates used for removing the excess filling protruding through the end heads of the moulds.
Figure 17:
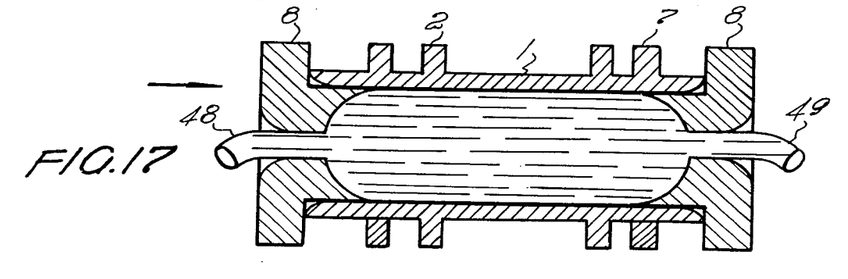
FIG. 17 is a longitudinal section of a mould loaded with filling and with the end heads in place.
Figure 18:
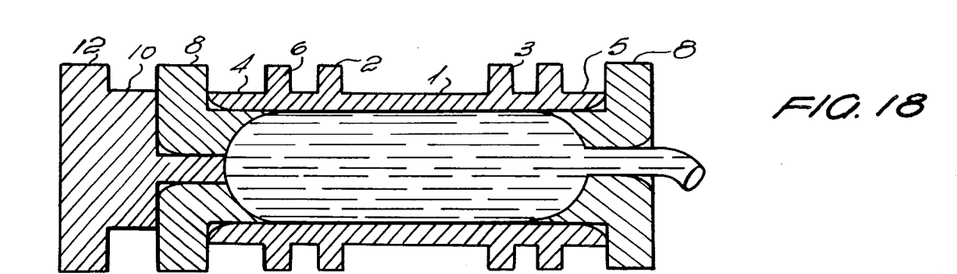

Once the filling of the mould is complete the loaded mould is separated from the paste feeder 30 by advancing the chain 14. If the paste spreads after filling, the excesses of paste may be removed, if necessary or desired, by plates flush with the ends of the mould shells as they pass by these plates which are located on each side of the chain at the end of station $a_1$. They are not shown in drawings, and are not absolutely necessary, but are similar to the plates 50 shown in FIG. 16 for removing excess paste tongues 48 and 49 (FIG. 17) after application of the end heads and likewise after application of the first cap. The excess paste in each case falls into a container 51.

Figure 6:
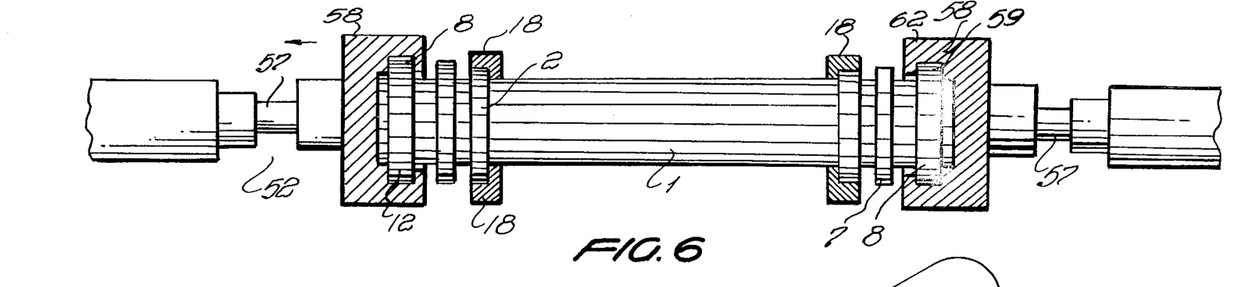
FIG. 6 is a cross section view of the mechanism which removes and puts on caps.

The mechanisms 52 for putting on the end heads are located at the beginning of the length $a_2$ and on each side of the corresponding portion of the chain of moulds (FIG. 6). The driving mechanism is provided by pneumatic cylinders 53 at each side, each having ducts 54 and 55 which alternatively act as inlets and outlets for the activating fluid of the piston 56. Each piston 56 is connected by a rod 57 to a holding joint 58 which has slots 59 providing lateral entrance and exit for accepting the flanges of the end heads 8 of the moulds. By supplying fluid through 54 when a mould is facing the axis of the cylinder 53, the piston 56, carrying a freshly loaded end head in the holding joint 58, is pushed and the end head 8 is inserted into the end of the shell 1 of the mould, the movement being facilitated by the flared inner shape of the shell ends. Once this step is completed the advance of the chain moves the end heads 8 along until each end head on the mould shell 8 is separated from its holding joint 58. At this moment the activating fluid is supplied to the cylinder 53 to bring the mechanism to the position for inserting a new end head, as described further below, after which the cycle is repeated.

The mechanism for putting on a cap on one side of the mould is located at the end of station $a_2$, and a similar mechanism for putting on a cap on the opposite side of the mould is located at the end of station $a_3$.

Figure 8:
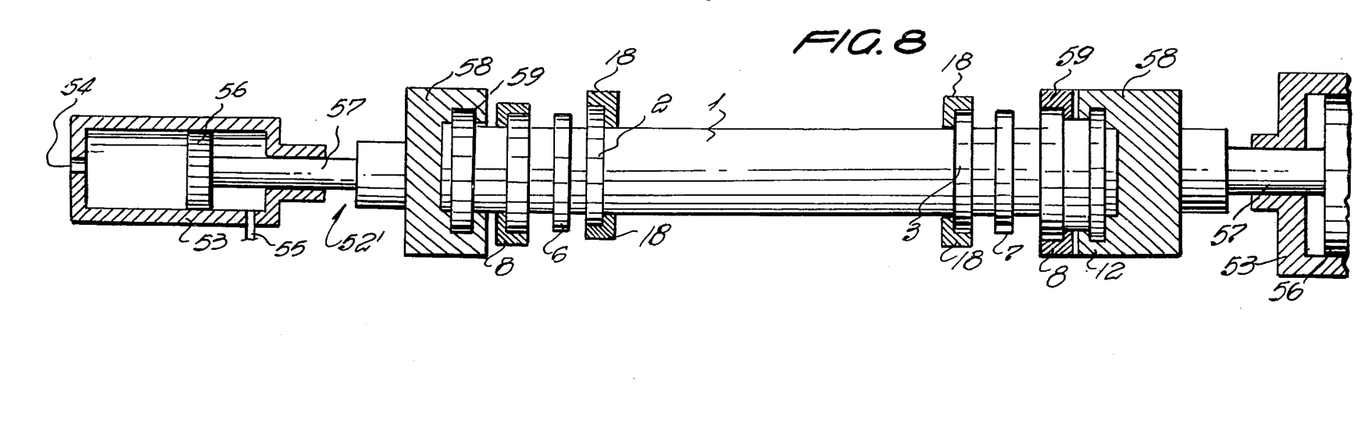
FIG. 8 is a cross section of the mechanism which removes and puts on end heads.

These mechanisms 52' (FIG. 8) are similar to the mechanism 52 with the only difference that those located on opposite sides of the chain are staggered with respect to each other in position lengthwise of the chain and operate at different phases, for the reason that will now be explained. The placing of a cap produces a certain compression of the paste and some of it will come out through the perforation 9 of the opposite end head. With a plate 50 (FIG. 16) positioned before the mechanism located at the end of $a_3$, the excess paste is scraped off. The other cap is set on and the paste is again compressed, this time giving it the necessary consistency for the form of the sausage to remain firm upon its removal from the mould.

After steps just described the loaded mould is ready to be subjected to the cooking stage at station $b$. Cooking means are provided and they can include any kind of oven that is adequate to the characteristics of the material of the mould and to the cooking time required by the needs of the process.

Figure 7:
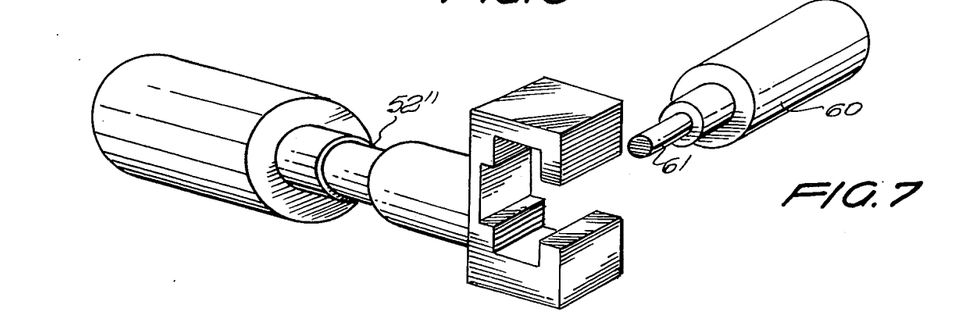
FIG. 7 is a perspective view of the mechanism shown in FIG. 6.

Upon completing the cooking stage the chain is advanced and the loaded moulds with the cooked paste are brought to a cooler $c$, the particular characteristics of which are not relevant to the invention. Thereafter the mechanisms for removing the caps are provided on each side of the chain. This mechanism includes equipment 52'' (FIG. 7) similar to that shown at 52 (FIG. 6) but having an additional impeller 60 having its axis perpendicular to the axis of the cylinder 53. A rod 61 protrudes from 60 for ejecting the cap which the holding joint has withdrawn towards the guides to be described later.

Holding means 62 are arranged on each side of the chain 14 for keeping the end heads 8 in place until the caps have been separated from them under the action of the holding joints. The mechanism for withdrawing the end heads is similar to the aforementioned device 52 (FIG. 6) and is represented as 52'' in FIG. 1. The mechanisms 52'' and 52'''and the extractor 63 (FIG. 20) immediately following them are all located on both sides of the chain and occupy the portion $d$ designated in FIG. 1.

Figure 20:
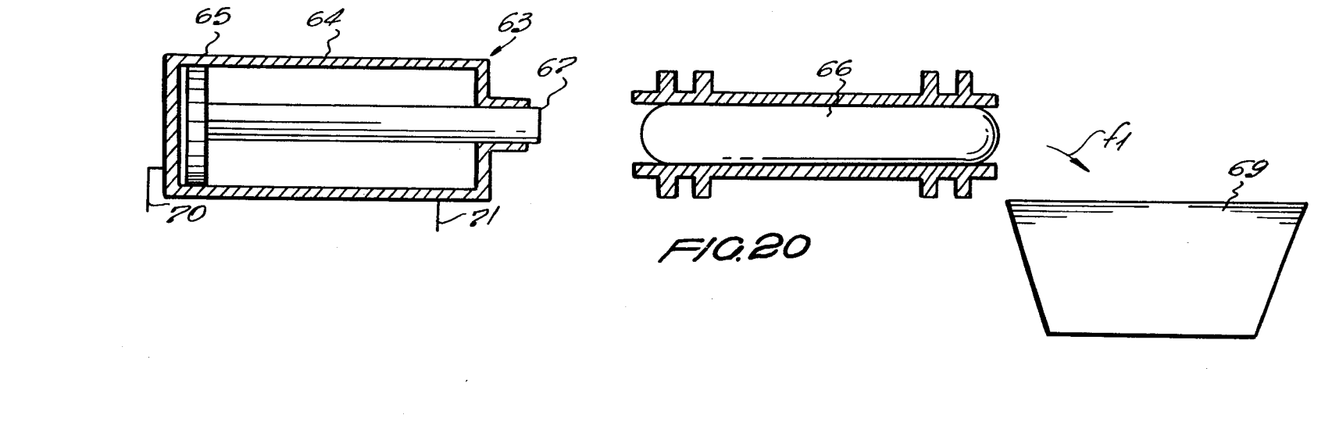
FIG. 20 is a schematic sectional view of one form of unloading mechanism.

As shown in FIG. 20, the extractor 63 is formed by a hydraulic cylinder 64 having a piston 65 and a rod 67 which is positioned facing to and coaxially with the waiting mould so that it can push a completed sausage 66 out of the mould and drop it into the container 69, as indicated by the arrow $f_1$. The ejecting action is the result of supplying activating fluid through the duct 70 to the cylinder 65, the exhaust fluid coming out through duct 71.

The washing station is designated $e$ in FIG. 1 and can be of a kind having any suitable washing medium as, for example, steam under pressure, hot water in jets or spray or other similar media, but its features are not a part of the invention and as suitable equipment is well known, it is not further described here.

Figure 23:
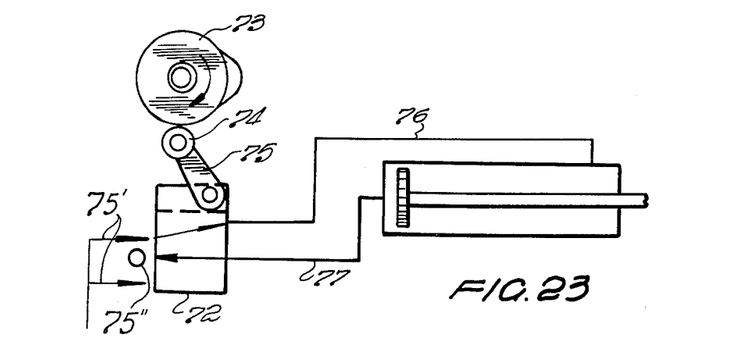
FIGS. 23 and 24 schematically show an arrangement of the controlling mechanism for advancing the chain respectively to its two positions of stop and advance.
Figure 24:
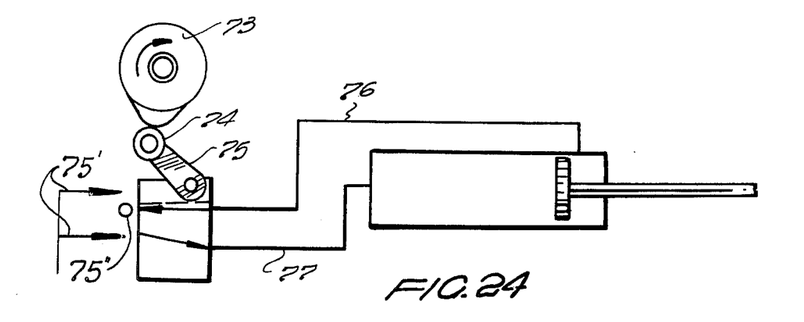

A manner of activating the hydraulic cylinders in mutual coordination and supplying them with drive fluid is shown in FIG. 23 and 24. This is done by means of a valve block having two passageways and which is operated by a rotary cam 73 acting on a follower wheel 74 set on an arm 75 which moves the valve block for positioning it as indicated in FIGS. 23 and 24, which respectively show opposite connections to a pressure fluid source represented by the arrow 75' and a drain 75'' to a fluid reservoir (not shown). The connections 76 and 77 of the corresponding hydraulic cylinder will then activate it in the desired direction.

Figures 25, 26:
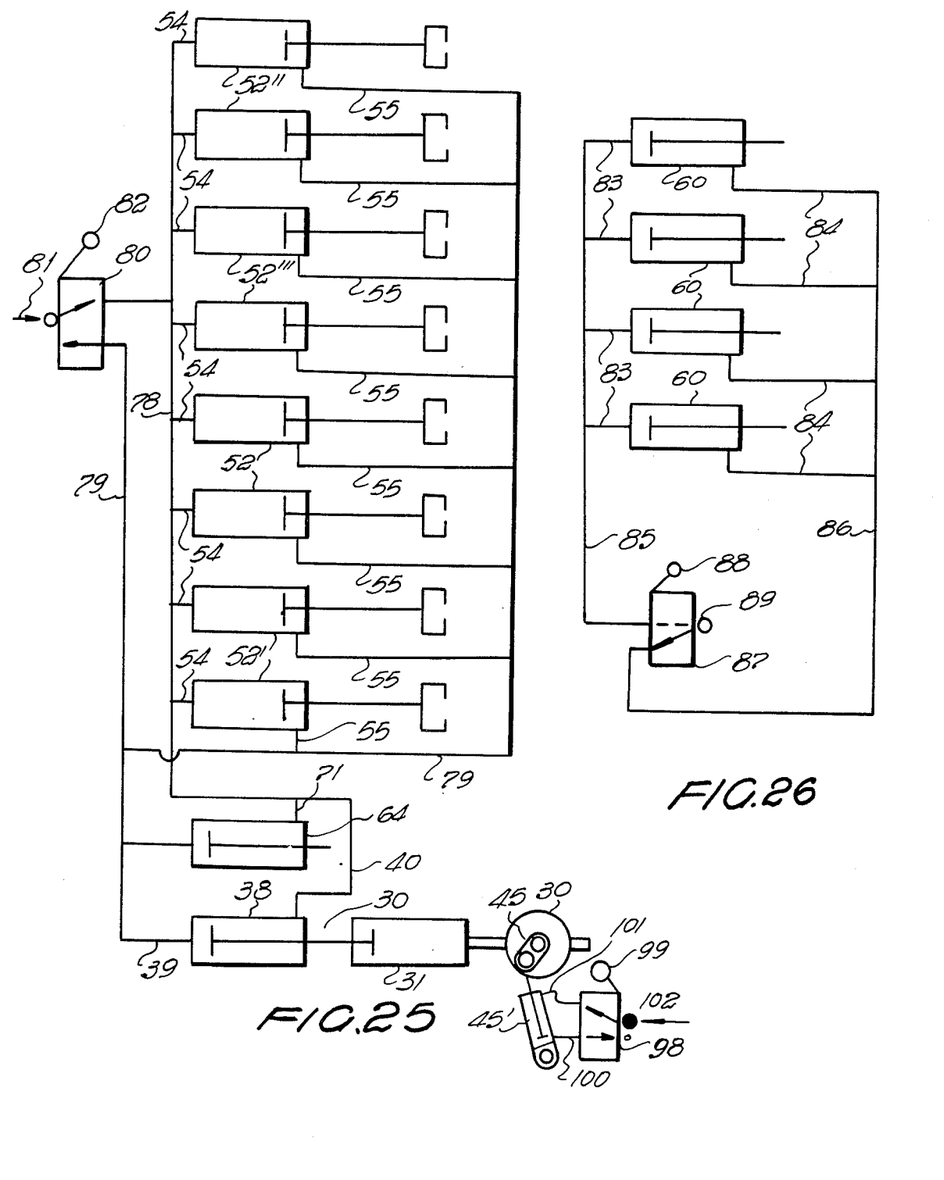
FIGS. 25 to 27 together provide a complete diagram of a hydraulic control circuit for the components of the apparatus control invention in one preferred application.

FIGS. 25 and 26, on the other hand, show the position of the different parts forming the hydraulic system and which are synchronized step by step with the movement of the chain 14, and are controlled by the mechanism shown in FIG. 27 as will be explained below.

The ducts 54 of the mechanisms 52, 52', 52'' and 52''' connect with a multiple 78, while the ducts 55 of said mechanisms connect with a second multiple 79, both multiples being connected with the two-way valve 80 which has an inlet 81 for fluid coming from a pressure source. A control lever operates the valve for connecting 81 with 80 and connecting 79 with the atmosphere (i.e., with a reservoir at atmospheric pressure) in one position, the one indicated in FIG. 25, or for connecting 81 with 79 and connecting 80 with the atmosphere in another position. The changes of positions of a control lever 82 determines the operation of the pistons from left to right in the position indicated in the figure or in the opposite direction in the other position.

The extractor 64, instead, is connected so that the movements are inverted in each of the aforementioned positions, as shown in FIG. 25. The cylinder 38 of the feeder 30 is arranged for operation in the same sense as the extractor.

As shown in FIG. 26, the impellers 60, instead, have their plungers connected by the conduits 83 and 84 joined by multiples 85 and 86 with the two-way valve 87 activated by the lever follower 88. In one position of that valve the multiple 85 connects with the atmosphere while the multiple 86 connects with a pressure fluid source through conduit 89; this makes the pistons in cylinders 60 move from left to right in the figure, while in the other position an opposite effect results.

Figure 27:
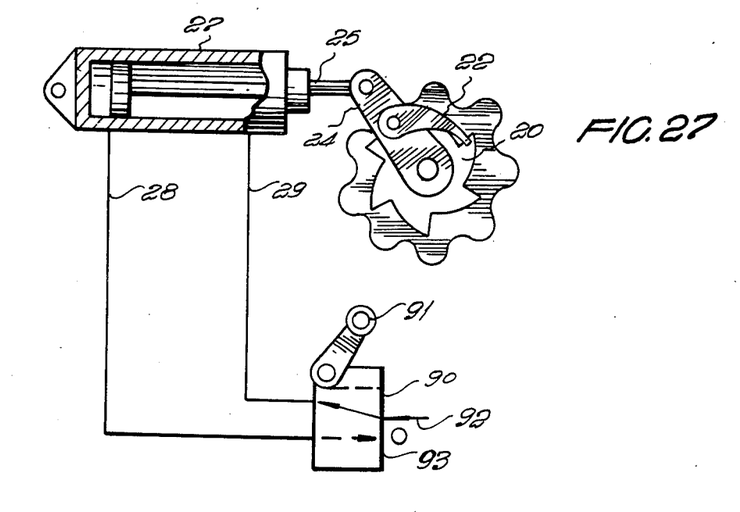
Figure 28:
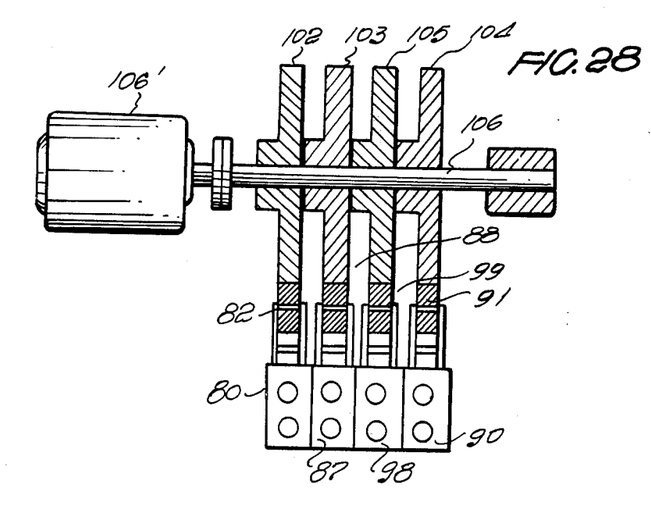
FIG. 28 is a side view, mostly in section, of a sequencing valve-operating device corresponding to part of the circuit of FIGS. 25 to 27.

As shown in FIG. 27, the conduits 28 and 29, previously referred to, are connected to a two-passage valve block, controlled by the lever follower 91, for determining the advancing and stopping cycles of the chain. By alternating the connections of 28 and 29 with the pressurized supply 92 and to the outlet 93, the alternate movement of the piston within the cylinder 27, and, thus, the intermittent movement of the chain 14 as has been indicated, can be achieved. For the purpose of stopping the chain during the periods it should not be moving, a notch-wheel 93' is provided on the shaft 21 (FIG. 22). The notch-wheel has notches in its perimeter where a pin 94 can be inserted. The pin is attached to a lever 95 and is inserted between the notches by means of a spring 96 which is secured to a firm position 97 on the frame of the described apparatus.

As shown in FIG. 25 the operation of the two-way valve 98 is controlled by the lever follower 99. The valve 98 determines the alternative connection of the conduits 100 and 101 of the cylinder 46 with the conduit 102 which comes from a pressure fluid source, thus permitting the movement of the valve 30 for the paste filling action and for resupplying paste as has been explained.

As shown in FIG. 27, the lever followers 82, 88, 91 and 101, corresponding to the valves 80, 87, 90 and 98, are controlled by the levers 102, 103, 104 and 105 fastened to a shaft 106 which is rotated by a motor 106' connected to it. The sequential operations of the equipment is thus determined by the relative disposition of the levers which activate the followers and establish the cycles and active periods of each of the components.

The movement of the end heads and of the caps 12 during the periods of time while they are removed from the mould and set on again, is as follows. Between the initial portions of station $d$ and the final portions of station $a_1$, a guide such as 107 is placed on one side of the endless chain 14, and a guide as 108 is placed between 52''' and the initial portion of station $a_2$, as indicated in FIGS. 9 to 12.

Figures 10, 11:
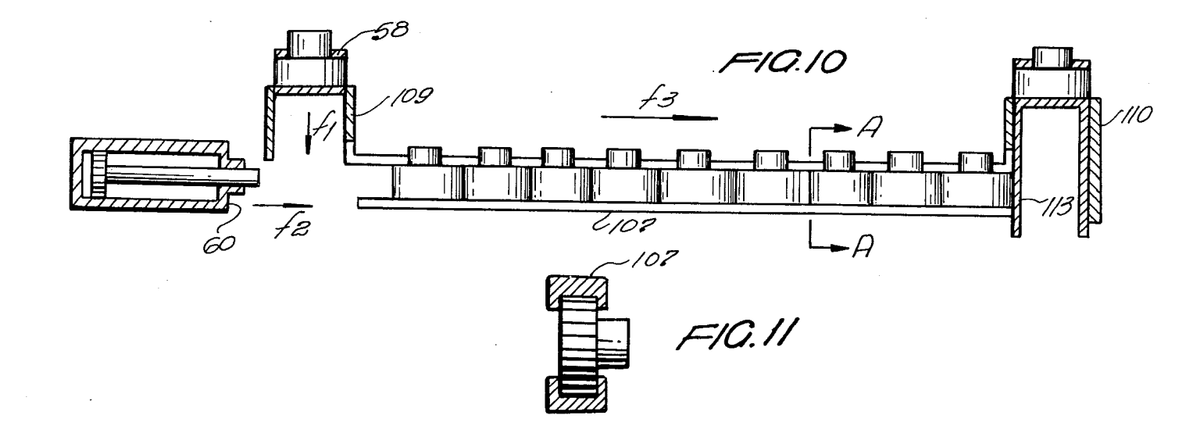
FIG. 11 is a sectional view on line A—A of FIG. 10.
Figure 12:
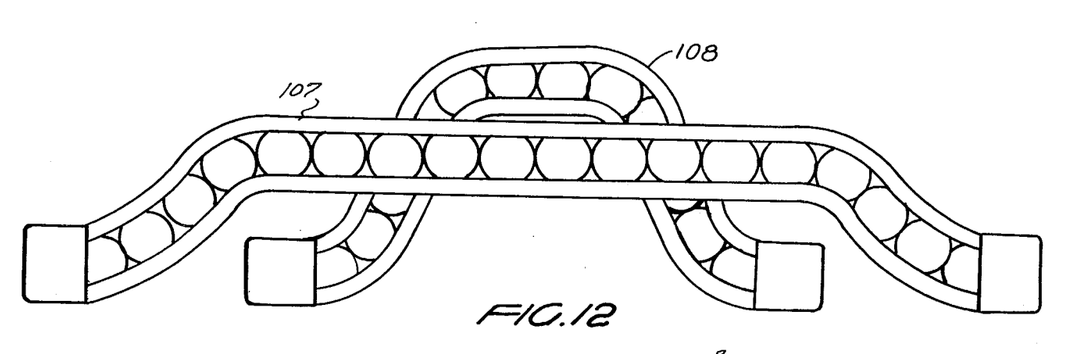
FIG. 12 is a view in side elevation of the mechanisms for moving the caps and end heads.

Said guides 107 and 108 have a double U section, as indicated in FIG. 11, so that the end head 8, or the circumferential joint 12 corresponding to the caps, may be guided within said U.

Figure 9:
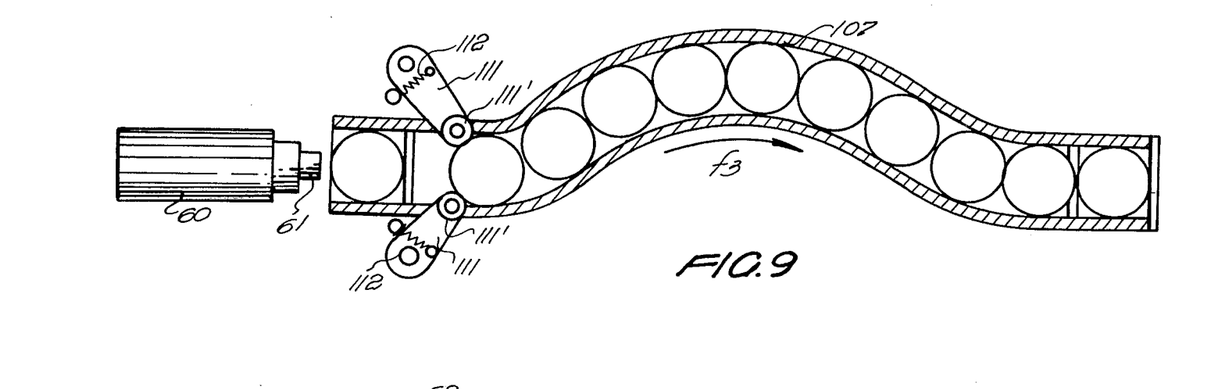
FIGS. 9 and 10 are respectively an elevation and a plan view of the mechanism which controls the movements of the caps and end heads.

The same guides have an entry section 109 and an exit section 110 which face the holding joints 58 for receiving them. A guiding portion proper of these guides extends between its said two sections and has an axis perpendicular to the axis of said sections. The guiding portion has an inlet and an outlet corresponding to the entry and exit sections. The entry 109 faces the rod 61 of the impeller 60, as shown in FIGS. 9 and 10.

A pair of stoppers 111 with their retaining pins 111' are brought to their active positions by the corresponding springs 112. When a holding joint of the mechanisms 52, 52', 52'' and 52''', brings out an end head or a cap moving in the direction $f_1$ (see FIG. 10) the holding joint will be facing a guide. At that time the piston which is moving the rod 61 in the direction $f_2$ will drive the end head or cap into the guide 108 or 107, respectively (FIG. 12) and will move the aggregated units as per arrows $f_3$; the curvature of the guides helping to bring in an end head or cap when the holding joints are aligned with the guides 107 and 108. In this manner, when a holding joint faces the outlet of the guide in the respective exit 113 it frees said outlet and allows an end head or cap to come into the groove 59 of the holding joint.

Figure 21:
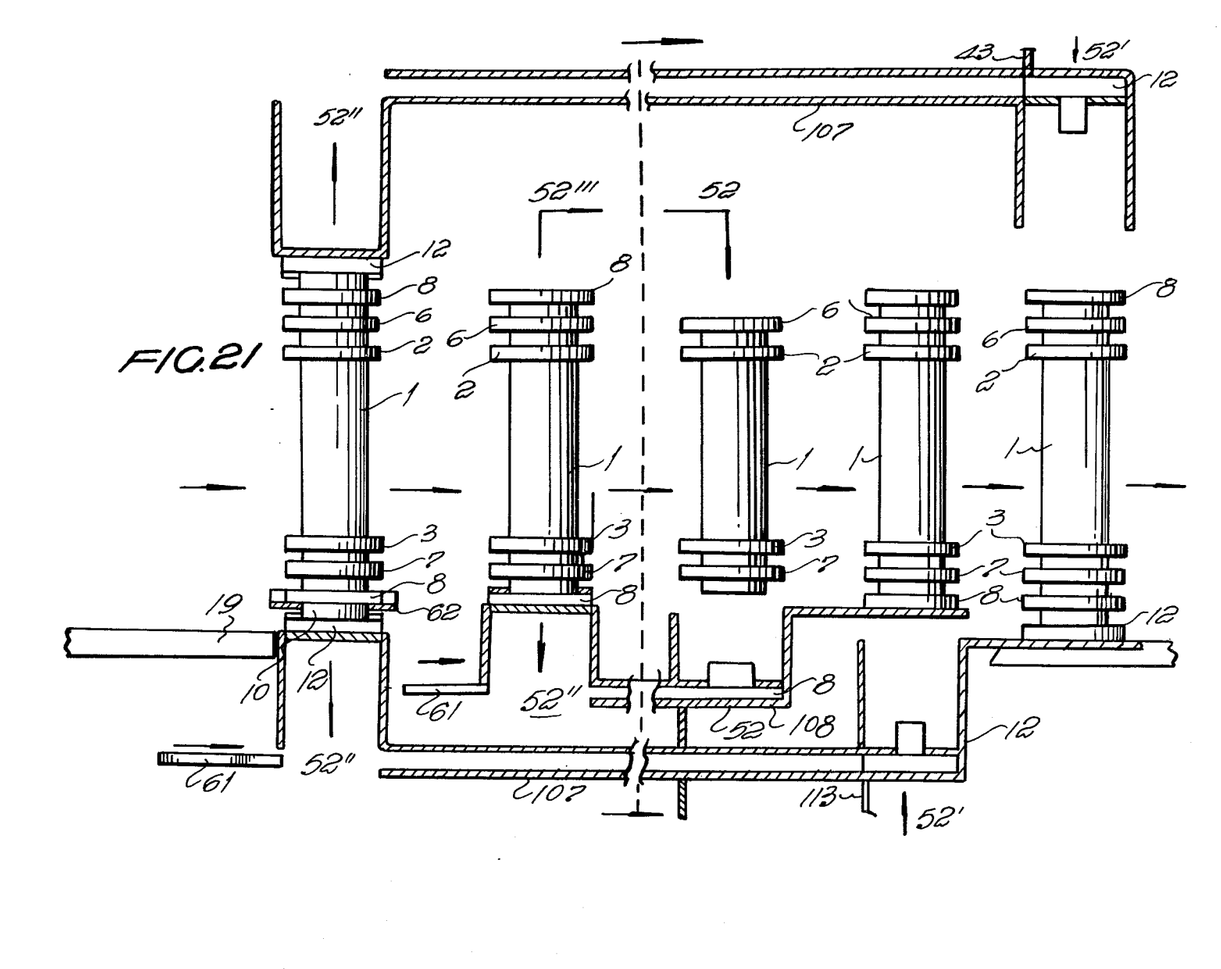
FIG. 21 is a large scale plan view of the position occupied by the elements which move the caps and end heads.

FIG. 21 clearly shows the relative arrangement of the chain 14 with its moulds and the mechanisms 52'', 52''', 52 and 52' respectively for removing the caps, for removing the end heads, for putting on the end heads and for putting on the caps. FIG. 21 also shows the different timing or phases for operating the mechanisms for putting on the caps which has been previously mentioned. The arrows indicate the directions in which each part of the arrangement is moving.

Figure 13:
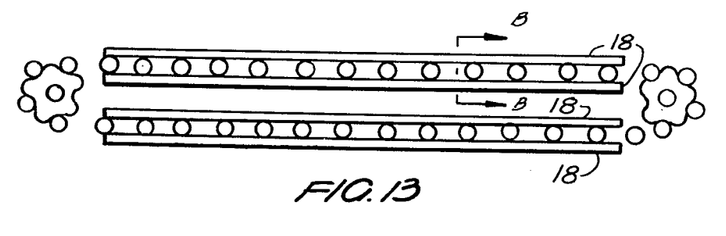
FIG. 13 is a detail elevation view of the arrangement of guides for the mould shells arranged in their chain.
Figure 14:
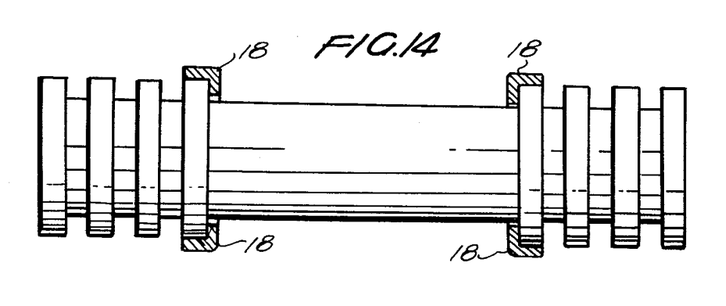
FIG. 14 is a sectional view along the line B—B of FIG. 13.

FIGS. 13 and 14 regarding the relation of the guides 18 to the moulds and FIGS. 15 and 19 regarding the disposition guides 19 and 20 for holding the caps 15 against coming off, are self-explanatory.

I claim:

1. An apparatus for making skinless sausages, comprising a plurality of moulds respectively having open-ended elongated hollow shells linked together transversely of their length in an endless chain and having separable end heads and caps remaining fitted thereto during part of the travel of the chain and remaining separated therefrom during part of the travel of the chain, said shells having at least one pair of peripheral ridges, including a pair serving to seat link means for linking said shells in said chain;

means for intermittently advancing said chain in a cyclical path;

means embracing the sides of said chain at a first station thereof for filling said shells of said moulds with a sausage making paste;

means embracing the sides of said chain at a second station thereof for applying end heads to both ends of successive moulds, said end heads each comprising a plug for providing an end profile to the interior of said mould and a flange extending beyond to exterior of said shell of said mould when said plug is inserted in said shell, both said flange and said plug being pierced by an axial perforation;

means embracing the sides of said chain staggered lengthwise of said chain respectively at third and fourth stations thereof for applying caps to said end heads applied to said moulds, first on one end and then on the other of each mould, said caps having stem members fitting into said perforations of said end heads to complete the end profile of said mould and having a body with a flange spaced from the flange of the adjacent end head when the stem member is fully inserted;

means for removing said caps from said end heads at a fifth station of said chain;

means for removing said end heads from said shells at a sixth station of said chain;

means for conveying a succession of separate caps from the means at said fifth station to the means at said third and fourth stations;

means for conveying a succession of separate end heads from said means at said sixth station to said means at said second station;

means for cooking the contents of said moulds, said cooking means surrounding said chain over a portion of said cyclical path intermediate of said fourth and fifth station;

means for removal of cooked sausages adjacent said chain at a seventh station thereof intermediate of said sixth and first stations;

means for intermittently advancing said chain past said stations in above-numbered order, and means for operating said means at said first, second, third, fourth, fifth, sixth and seventh stations in coordination with said advancing means.

2. An apparatus for making skinless sausages as defined in claim 1, in which there are provided between said second and fourth stations means for removing excess filling protruding from the perforations of said end heads.

3. An apparatus for making skinless sausages as defined in claim 1 in which a region for cooling said moulds and their cooked contents is provided surrounding said chain between said cooking means and said fifth station.

4. An apparatus for making skinless sausages as defined in claim 1 in which means for washing said moulds is provided surrounding said chain between said seventh and first stations and in which means for washing said end heads and said caps are provided surrounding a portion of said means for conveying a succession of separate end heads and surrounding a portion of said means for conveying a succession of separate caps.

5. An apparatus for making skinless sausages as defined in claim 1, in which said link means have a figure-8 configuration.

6. An apparatus for making skinless sausages as defined in claim 1 in which fixed guide means engageable by at least one peripheral ridge of each mould of said chain are provided for guiding the travel of said chain.

7. An apparatus for making skinless sausages as defined in claim 1 in which there are provided fixed guide means extending adjacent said chain between said fourth and said fifth stations for preventing outward movement of said caps.

8. An apparatus for making skinless sausages as defined in claim 1 in which each least two pairs of sprocket wheels are provided for maintaining the position of said chain, in which also one of said pairs of sprocket wheels is arranged to be intermittently driven by said advancing means and in which one of said pairs of sprocket wheels is mounted on a shaft on which is mounted a notched wheel and in which also pin means for engaging and arresting said notched wheel are provided mounted on a lever controled in position by the rod of a piston of a hydraulic cylinder operated in coordination with said advancing means by said operating means.

9. An apparatus for making skinless sausages as defined in claim 1 in which said filling means comprises branching valve means, an inlet pipe and first and second branch pipes arranged to be interconnected by said valve means and also piston means in said first branch pipe and means for operating said valve means and said piston means causing, in sequence, said first branch pipe to be filled from said inlet through said valve means with sausage making paste and then propelling said paste from said first branch pipe through said valve means and said second branch pipe into a mould of said chain.

10. An apparatus for making skinless sausages as defined in claim 1 in which said means at said first, second and third stations includes hydraulic operating means comprising controllably movable rods secured to holding joint blocks provided with a pair of laterally open grooves dimensioned for accepting and releasing, in the direction of movement of said chain, an end head or a cap of a mould, as the case may be, the direction of movement of said rods being transverse to the direction of movement of said chain.

11. An apparatus for making skinless sausages as defined in claim 1 in which said means at said fifth and sixth stations include hydraulically operated first means comprising rods controllably moveable in a direction transverse to the direction of movement of said chain equipped with holding joint blocks, each having a pair of laterally open grooves dimensioned for acceptance and release of an end head or a cap of a mould, as the case may be, and second hydraulically operated means comprising an impeller rod with its axis parallel to the grooves of the holding joint blocks and positioned so as to slide in front of the position occupied by the holding joints when they are retracted.

12. An apparatus for making skinless sausages as defined in claim 1 in which said operating means comprises a multiplicity of double acting hydraulic cylinders and pistons respectively associated with said means at said first, second, third, fourth, fifth, sixth and seventh stations, each connected to a two-path valve arranged for interchanging connections of a cylinder respectively to a pressure fluid source and to a reservoir at atmospheric pressure, each such valve having a control shaft connected to a lever provided with a lever follower arranged for accuation by a cam, the cams for all the said valves being driven by a common drive coordinated with said means for intermittently advancing said chain.

13. An apparatus for making skinless sausages as defined in claim 12, in which said hydraulic cylinders and pistons associated with said heating means at said first station and said unloading means at said seventh station are arranged for operation in inverse phase with respect to said operating means at said second, third, fourth, fifth and sixth stations and in which said operating means at said fifth and sixth stations include second hydraulic cylinder and piston means likewise operating in inverse phase to the previously mentioned operating means at said fifth and sixth stations.

14. A mould for a skinless sausage manufacturing machine comprising:

an open ended, hollow and elongated cylindrical shell having an inner surface outwardly flaring in a curve at the end and having a peripheral ridge near but spaced from each end;

an end head for each end of such shell in the form of a separate body having a tongue fitting flush with the inner surface of said shell, inwardly of the flared end thereof, and providing a sausage-end shaping surface, having an axial perforation and also having a peripheral flange of a diameter of approximately the same magnitude as the outer diameter of said ridges of said shell, and a cap for each end head in the form of a separate body fitting said end head, having a stem dimensioned for projecting through said perforation of said end head and completing said sausage-end shaping surface, having a flange of an outer diameter approximately equal to the outer diameter of the ridges of said shell and having a shoulder fitting against the outer surface of said end head and having a diameter such as to leave an annular space between the flange of said cap and the flange of said end head.

15. A mould as defined in claim 14 in which said shells are provided with a second pair of ridges, one near each end of said shell, the ridges of said first pair being spaced from the ridges of said second pair and the ridges of both pairs being spaced from the adjacent end of said shell.

16. A mould as defined in claim 14 in which said shell is provided with a pair of rings rotatable on the outer surface of said shell and keyed in the axial direction of said shell by a variation in girth of said shell, said rings being spaced from said ridges and both said rings and said ridges being spaced from the adjacent end of said shell.

* * * * *